United States Patent
Lee

(10) Patent No.: US 12,547,778 B2
(45) Date of Patent: Feb. 10, 2026

(54) MALICIOUS ATTACK PROTECTION CIRCUIT, SYSTEM-ON-CHIP INCLUDING THE SAME, AND OPERATING METHOD THEREOF

(71) Applicant: Samsung Electronics Co., Ltd., Suwon-si (KR)

(72) Inventor: Hyunwook Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 551 days.

(21) Appl. No.: 17/878,313

(22) Filed: Aug. 1, 2022

(65) Prior Publication Data

US 2023/0195941 A1 Jun. 22, 2023

(30) Foreign Application Priority Data

Dec. 22, 2021 (KR) ........................ 10-2021-0185405

(51) Int. Cl.

| | |
|---|---|
| G06F 21/71 | (2013.01) |
| G06F 1/08 | (2006.01) |
| H03K 5/22 | (2006.01) |
| H03K 19/20 | (2006.01) |
| H03K 21/00 | (2006.01) |
| H03K 5/125 | (2006.01) |
| H04L 9/00 | (2022.01) |

(52) U.S. Cl.
CPC ............... *G06F 21/71* (2013.01); *G06F 1/08* (2013.01); *H03K 5/125* (2013.01); *H03K 5/22* (2013.01); *H03K 19/20* (2013.01); *H03K 21/00* (2013.01); *H04L 9/003* (2013.01)

(58) Field of Classification Search
CPC ........... H03K 5/125; H03K 5/22; H04L 9/003
See application file for complete search history.

(56) References Cited

U.S. PATENT DOCUMENTS 6,834,093 B1 * 12/2004 Chiu ..................... G01R 23/005
                                                                    327/43
8,195,954 B2    6/2012 Sohn
(Continued)

FOREIGN PATENT DOCUMENTS

| JP | H0916281 A | * | 1/1997 | ........... H03K 19/003 |
| JP | H11355110 A | * | 12/1999 | |

(Continued)

*Primary Examiner* — William R Korzuch
*Assistant Examiner* — Aditya Sriram
(74) *Attorney, Agent, or Firm* — Muir Patent Law, PLLC

(57) ABSTRACT

Provided are a malicious attack protection circuit, a system-on-chip including the same, and an operating method thereof. The malicious attack protection circuit includes a reference interrupt generator to output a reference interrupt signal every reference interrupt period, a variable clock manager for outputting an operating clock signal to a logic circuit outside the malicious attack protection circuit and a variable clock signal having a variable period, a variable interrupt generator to output an interrupt signal every variable interrupt period based on the variable clock signal, a comparison circuit to compare the reference interrupt signal with the interrupt signal and output a comparison result signal, and a controller that interrupts the output of the operating clock signal input to the logic circuit, according to the comparison result signal.

19 Claims, 13 Drawing Sheets

(56) References Cited

U.S. PATENT DOCUMENTS

| | | |
|---|---|---|
| 8,427,194 B2 | 4/2013 | Deas et al. |
| 8,688,995 B2 | 4/2014 | Teglia |
| 9,092,621 B2 | 7/2015 | Riou |
| 9,645,602 B2 | 5/2017 | Zhang et al. |
| 10,429,882 B2 | 10/2019 | Kobayashi et al. |
| 10,771,236 B2 | 9/2020 | Courtney |
| 10,775,832 B2 | 9/2020 | Tamura |
| 10,915,635 B2 | 2/2021 | Hars |
| 10,958,414 B2 | 3/2021 | Stark |
| 11,074,344 B2 | 7/2021 | Alam et al. |
| 2004/0232966 A1* | 11/2004 | Killig ............ G06F 1/06 327/277 |
| 2007/0069875 A1* | 3/2007 | Doi ............ G06F 21/554 340/440 |
| 2010/0225380 A1* | 9/2010 | Hsu ............ G06F 21/87 327/514 |
| 2011/0163736 A1* | 7/2011 | Trimmer ............ G01R 31/31727 324/76.41 |
| 2014/0211906 A1* | 7/2014 | Herbeck ............ H03K 23/40 377/47 |
| 2014/0327573 A1* | 11/2014 | Leibner ............ G01S 19/215 342/357.59 |
| 2015/0032787 A1 | 1/2015 | Gammel et al. |
| 2016/0006544 A1* | 1/2016 | Cowley ............ H03K 5/13 327/20 |
| 2018/0307835 A1* | 10/2018 | Buch ............ G06F 21/755 |
| 2018/0323960 A1 | 11/2018 | Courtney |
| 2019/0332135 A1* | 10/2019 | Tamura ............ G06F 1/06 |

FOREIGN PATENT DOCUMENTS

| | | |
|---|---|---|
| JP | 2017079336 A | 4/2017 |
| KR | 1020080073502 A | 8/2008 |
| KR | 1020210071241 A | 6/2021 |

* cited by examiner

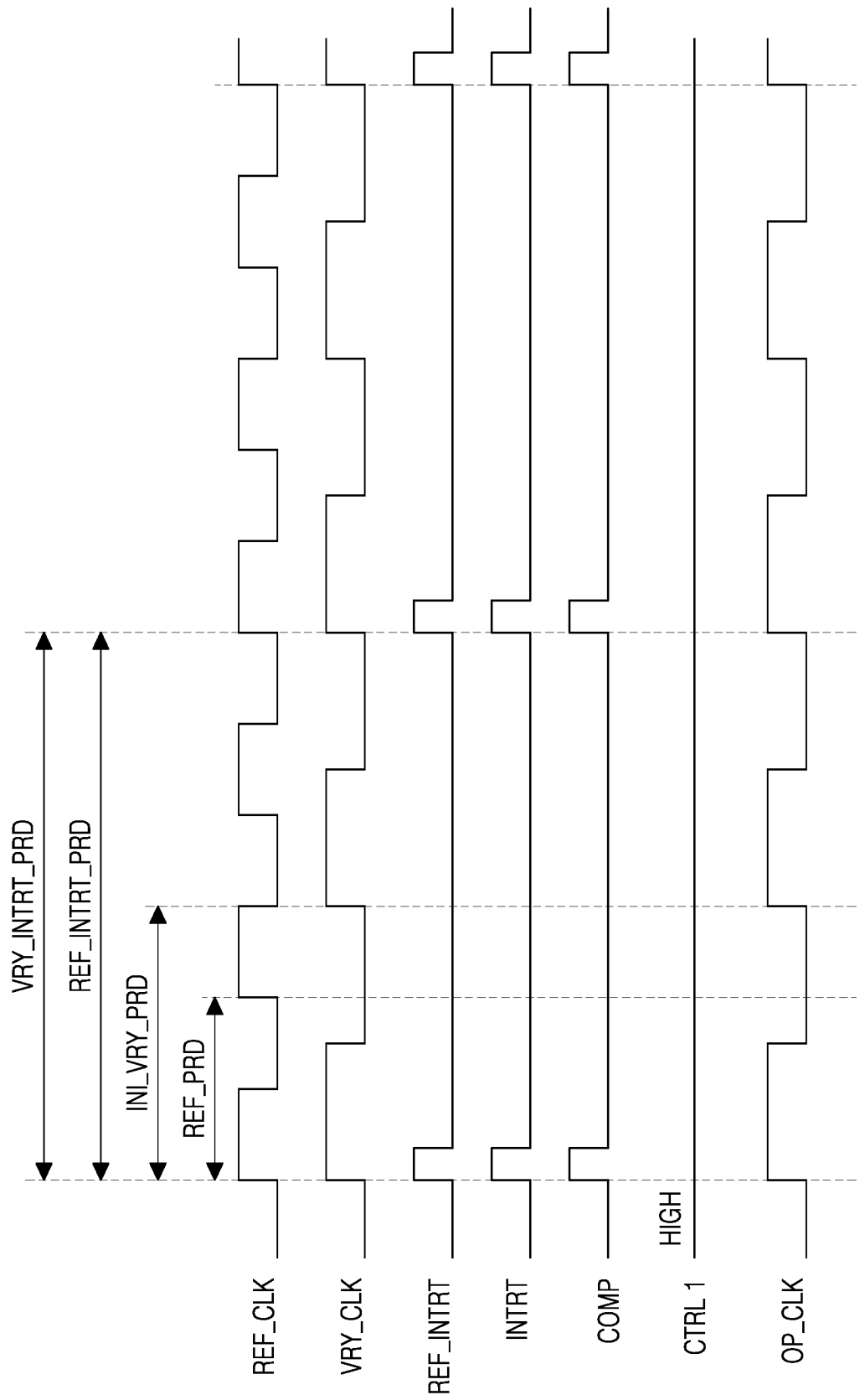

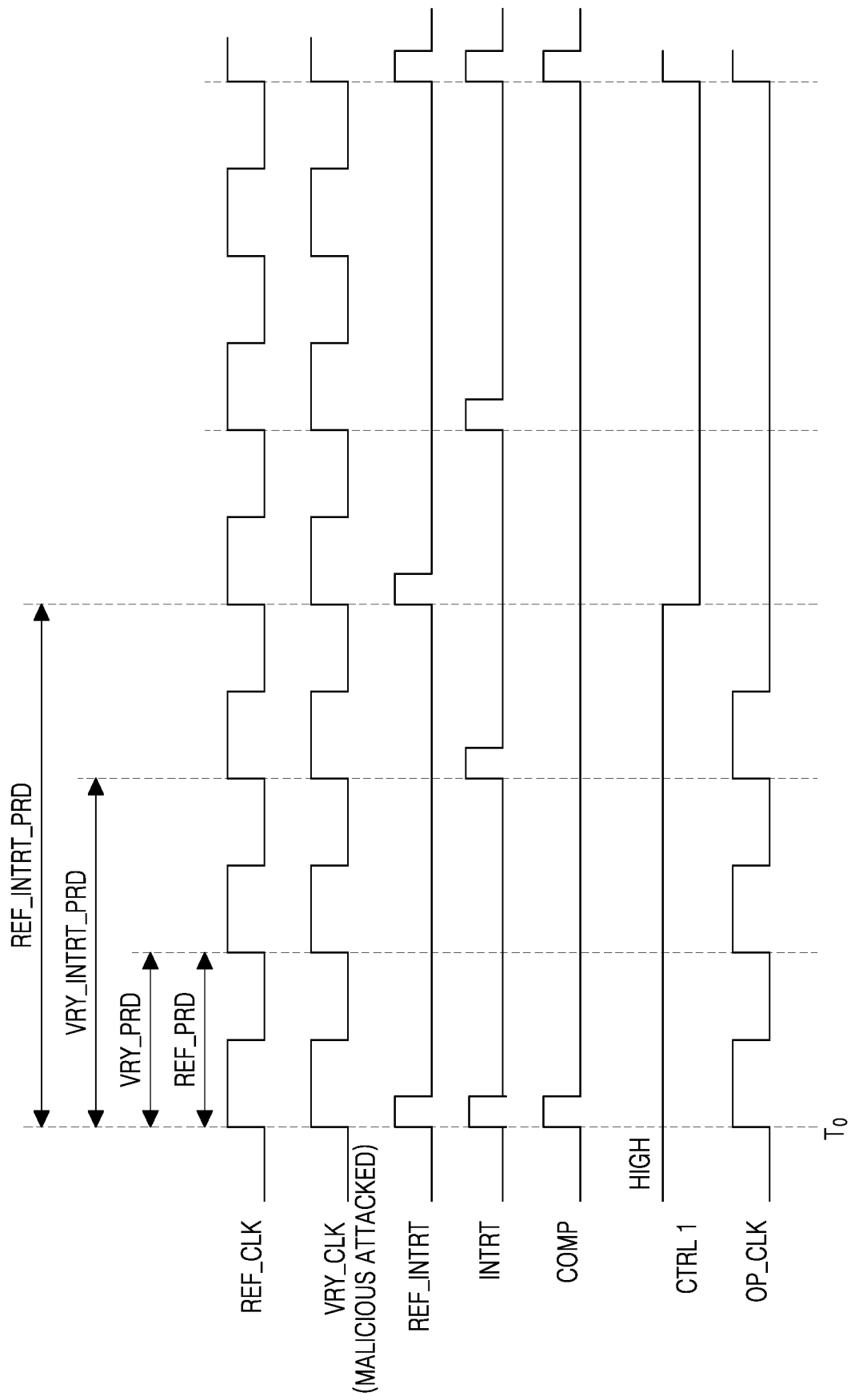

MALICIOUS ATTACK PROTECTION CIRCUIT, SYSTEM-ON-CHIP INCLUDING THE SAME, AND OPERATING METHOD THEREOF

CROSS-REFERENCE TO RELATED APPLICATION(S)

This application is based on and claims priority under 35 U.S.C. § 119 to Korean Patent Application No. 10-2021-0185405, filed on Dec. 22, 2021, in the Korean Intellectual Property Office, the disclosure of which is incorporated by reference herein in its entirety.

BACKGROUND

The inventive concept relates to an electronic device, and more particularly, to a malicious attack protection circuit, a system-on-chip including the same, and an operating method thereof.

In cryptography, a sub-channel attack adopts an attack method based on information about a physical implementation process of a cryptosystem instead of finding a weak point in an algorithm or performing indiscriminate attacks. For example, additional information that can be exploited for system breakdown may be obtained through require time information, power consumption, electromagnetic waves emitted, and even sound. Some sub-channel attacks require technical knowledge of the internal operation of a system in which an encryption is implemented, but other sub-channel attacks are also effective by even black box attacks, such as power difference analysis. Encrypted information inside a device, such as encryption keys, partial state information, full or partial plaintext text, may be found through analysis of changes in power consumed by the device or electromagnetic waves emitted by the device during performing a cryptographic algorithm operation process.

In this case, an attacker performs an attack in advance that causes a device to operate, for example, with a clock at a lower speed by modulating the period of the operating clock in order to lower the operating speed of the device, to thereby easily observe or analyze changes in physical information measured from the device.

SUMMARY

The inventive concept provides a malicious attack protection circuit that detects and prevents malicious attacks by malicious users, a system-on-chip including the same, and an operating method thereof.

According to an aspect of the inventive concept, there is provided a malicious attack protection circuit including: a reference interrupt generator configured to output a reference interrupt signal every reference interrupt period; a variable clock manager configured to output an operating clock signal to a logic circuit outside the malicious attack protection circuit and output a variable clock signal having a variable period; a variable interrupt generator configured to output an interrupt signal every variable interrupt period based on the variable clock signal; a comparison circuit configured to compare the reference interrupt signal with the interrupt signal and output a comparison result signal indicating a comparison result; and a controller configured to output at least one of a first control signal indicating to stop the output of the operating clock signal and a second control signal indicating that the logic circuit operates in a malfunction mode, according to the comparison result signal.

According to another aspect of the inventive concept, there is provided a system-on-chip including: a logic circuit configured to perform an overall operation in response to an operating clock signal in a normal mode; and a malicious attack protection circuit configured to output the operating clock signal to the logic circuit based on a variable clock signal, and to perform at least one of a first control operation of interrupting the output of the operating clock signal, and a second control operation of controlling the logic circuit to enter a malfunction mode from the normal mode, according to whether or not to modulate the variable clock signal. The malicious attack protection circuit includes: a reference timer configured to output a reference interrupt signal whenever a preset reference interrupt period arrives; a variable clock generator configured to output the variable clock signal; a monitoring timer configured to output an interrupt signal every variable interrupt period changed according to a variable period of the variable clock signal; a comparison circuit configured to output a comparison result signal indicating whether a logic value of the reference interrupt signal coincides with a logic value of the interrupt signal; a controller configured to output at least one of a first control signal corresponding to the first control operation and a second control signal corresponding to the second control operation, according to the comparison result signal; and a clock gating circuit configured to output the variable clock signal as the operating clock signal or interrupts the output of the operating clock signal, according to the first control signal.

According to another aspect of the inventive concept, there is provided an operating method of a system-on-chip that includes a logic circuit, the operating method including: initializing a variable period of a variable clock signal in response to power supplied from outside the system-on-chip; initializing a reference interrupt period, which is a period during which a reference interrupt signal is output, and a variable interrupt period, which is a period during which an interrupt signal is output; outputting the reference interrupt signal every reference interrupt period and outputting the interrupt signal every variable interrupt period; checking a comparison result signal indicating whether the logic value of the reference interrupt signal matches the logic value of the interrupt signal; and operating the logic circuit in a normal mode or a malfunction mode according to the comparison result signal. The reference interrupt period is an integer multiple of the initialized variable period of the variable clock signal.

BRIEF DESCRIPTION OF THE DRAWINGS

Embodiments of the inventive concept will be more clearly understood from the following detailed description taken in conjunction with the accompanying drawings in which:

FIGS. 7A and 7B are waveform diagrams illustrating a circuit for implementing a comparison circuit according to example embodiments of the inventive concept, respectively;

DETAILED DESCRIPTION OF THE EMBODIMENTS

Hereinafter, embodiments of the inventive concept will be described in detail by referring to the attached drawings.

Figure 1:
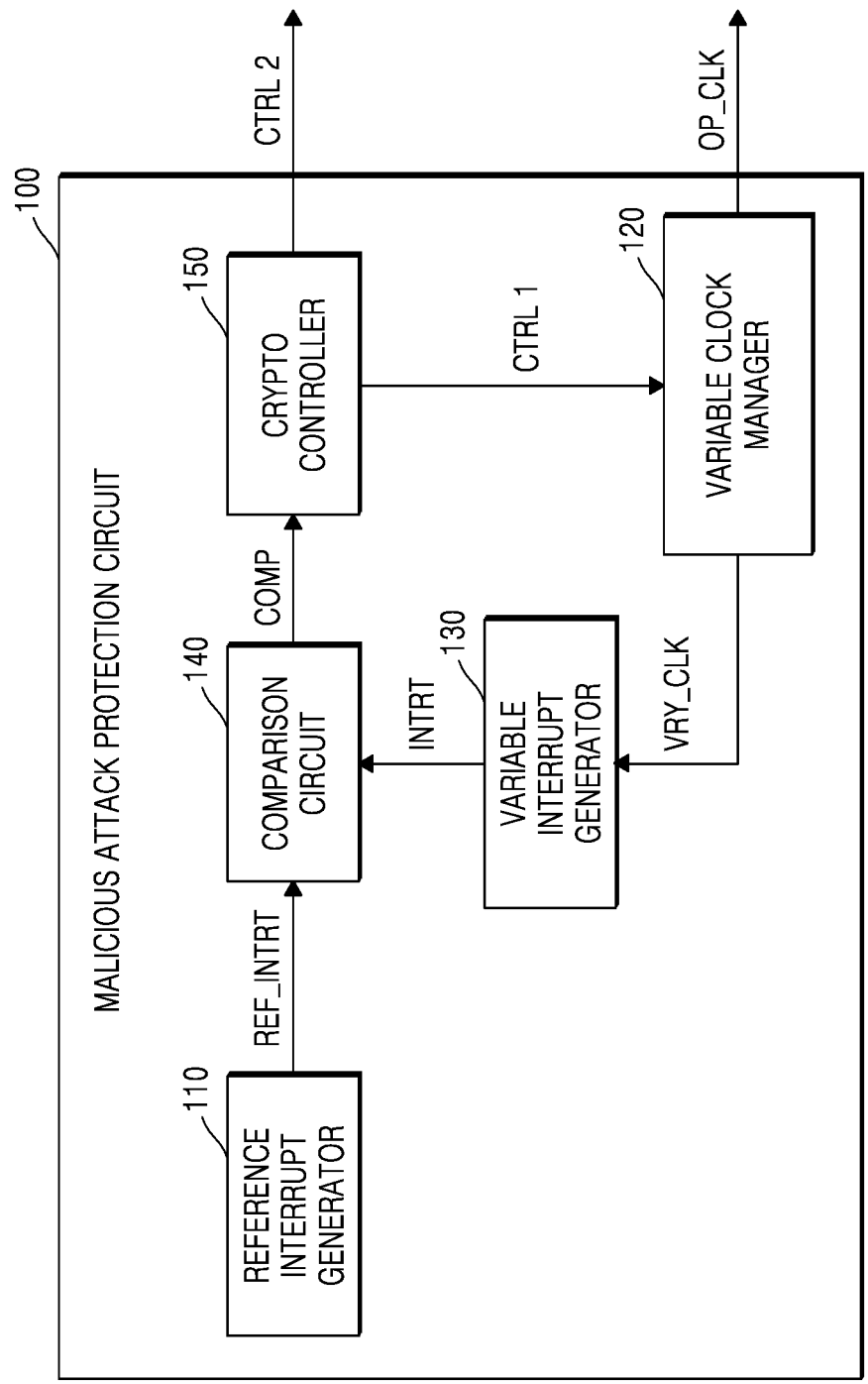
FIG. 1 is a block diagram illustrating a malicious attack protection circuit according to an example embodiment of the inventive concept.

FIG. 1 is a block diagram illustrating a malicious attack protection circuit according to an example embodiment of the inventive concept.

Referring to FIG. 1, a malicious attack protection circuit 100 may output an operating clock signal OP_CLK used for a logic circuit (e.g., depicted as reference numeral 200 in FIG. 8) to perform an operation. The malicious attack protection circuit 100 may be a circuit that detects and prevents attacks from malicious users. When a malicious attack is detected, the malicious attack protection circuit 100 may interrupt the output of the operating clock signal OP_CLK. In addition, when a malicious attack is detected, the malicious attack protection circuit 100 may output a control signal (e.g., a second control signal CTRL 2) for controlling the operation of the logic circuit.

In an example, the malicious attack protection circuit 100 outputs an operating clock signal OP_CLK to the logic circuit based on a variable clock signal VRY_CLK, and performs at least one of a first control operation of interrupting the output of the operating clock signal OP_CLK, and a second control operation of controlling the logic circuit to enter a malfunction mode from a normal mode of the logic circuit, according to whether or not to modulate the variable clock signal VRY_CLK.

The malicious attack protection circuit 100 and the logic circuit may be included in a system-on-chip (not shown), an electronic device, or the like.

The malicious attack protection circuit 100 may include a reference interrupt generator 110, a variable clock manager 120, a variable interrupt generator 130, a comparison circuit 140, and a crypto controller 150.

The reference interrupt generator 110 may output a reference interrupt signal REF_INTRT every preset reference interrupt period. The reference interrupt period may be a period with which the reference interrupt signal REF_IN-TRT is output. The reference interrupt signal REF_INTRT may be a pulse-type digital signal, but is not limited thereto. The digital signal may be a signal having a first logic value (or bit value) or a second logic value. The first logic value may be, for example, "1" (or 1 bit, logic high level) and the second logic value may be "0" (or 0 bit, logic low level). However, they are not limited thereto. Hereinafter, it is assumed that the first logic value is "1" and the second logic value is "0".

The variable clock manager 120 may output a variable clock signal VRY_CLK and an operating clock signal OP_CLK. The variable clock signal VRY_CLK may have a variable period and a clock frequency corresponding to the variable period. The operating clock signal OP_CLK may be a clock signal corresponding to the variable clock signal VRY_CLK. In an embodiment, the operating clock signal OP_CLK may be the same as the variable clock signal VRY_CLK, but is not limited thereto. When power is supplied to a system-on-chip, a variable period of the variable clock signal VRY_CLK and a clock frequency may be initialized. Accordingly, the variable clock manager 120 may output a variable clock signal VRY_CLK having an initialized initial variable period and a clock frequency corresponding to the initial variable period. In this case, the initial variable period and the clock frequency corresponding to the initial variable period may be set to a value optimized for a normal operation of a logic circuit. The malicious user may arbitrarily change the variable period and clock frequency of the variable clock manager 120. In this case, the variable clock manager 120 may output a variable clock signal VRY_CLK having a period and a clock frequency, which are different from an initial variable period and a clock frequency, which are initially set.

The variable interrupt generator 130 may output an interrupt signal INTRT every variable interrupt period based on the variable clock signal VRY_CLK. The variable interrupt period may be a period with which the interrupt signal INTRT is output. The variable interrupt period may vary according to a variable period (or clock frequency) of the variable clock signal VRY_CLK. The interrupt signal INTRT may be a digital signal in the form of a pulse, like the reference interrupt signal REF_INTRT, but is not limited thereto.

The comparison circuit 140 may compare the reference interrupt signal REF_INTRT with the interrupt signal INTRT and output a comparison result signal COMP indicating a comparison result. When the reference interrupt signal REF_INTRT and the interrupt signal INTRT are digital signals, the comparison circuit 140 may compare a logic value of the reference interrupt signal REF_INTRT with a logic value of the interrupt signal INTRT. In an embodiment, the comparison circuit 140 may check whether the logic value of the reference interrupt signal REF_INTRT matches the logic value of the interrupt signal INTRT. In this case, the comparison result signal COMP may be a digital signal having a first logic value or a second logic value. In this case, the first logic value of the comparison result signal COMP may mean, for example, match (or pass), and the second logic value of the comparison result signal COMP may mean, for example, mismatch (or fail). However, they are not limited thereto.

The crypto controller 150 may output at least one control signal of the first control signal CTRL 1 and the second control signal CTRL 2 according to the comparison result signal COMP. For example, when the logic value of the comparison result signal COMP is the first logic value, the crypto controller 150 may output the first control signal CTRL 1 and/or the second control signal CTRL 2. As another example, when the logic value of the comparison result signal COMP is the first logic value, the crypto controller 150 may output the first control signal CTRL 1 having the first logic value and/or the second control signal CTRL 2 having the first logic value. However, they are not limited thereto. The first control signal CTRL 1 may be a signal for performing a first control operation. The first control operation may be, for example, an operation instructing to interrupt the output of the operating clock signal OP_CLK. Herein, the interrupting of the output of the operating clock signal OP_CLK may mean that a logic value of the operating clock signal OP_CLK has the second logic value. The second control signal CTRL 2 may be a signal for performing a second control operation. The second control operation may be, for example, a control signal instructing the logic circuit to operate in a malfunction mode. The malfunction mode may be a mode in which an abnormal operation is intentionally executed. According to an embodiment, the crypto controller 150 may check the logic value of the comparison result signal COMP every reference interrupt period. The crypto controller 150 according to the inventive concept may be referred to as a controller, a control unit, a control logic, or the like.

Figure 2:
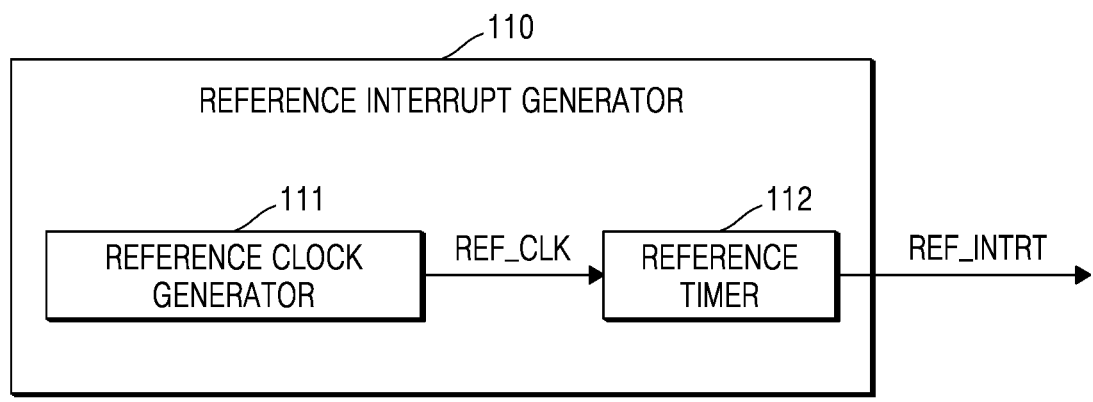
FIG. 2 is a block diagram illustrating a reference interrupt generator according to an example embodiment of the inventive concept.

FIG. 2 is a block diagram illustrating a reference interrupt generator according to an example embodiment of the inventive concept.

Referring to FIG. 2, the reference interrupt generator 110 may include a reference clock generator 111 and a reference timer 112.

The reference clock generator 111 may output a reference clock signal REF_CLK having a constant reference period. The reference clock generator 111 may be implemented in hardware, such as a crystal and/or a resonator. Since the reference clock generator 111 is implemented in hardware, the reference clock signal REF_CLK is not changed unless a malicious user physically damages the reference clock generator 111. That is, the reference period of the reference clock signal REF_CLK and the clock frequency corresponding to the reference period are constant.

The reference timer 112 may output a reference interrupt signal REF_INTRT whenever a preset reference interrupt period arrives (or reaches).

In an embodiment, the reference timer 112 may generate time information based on a clock source. Here, the clock source may be, for example, the reference clock signal REF_CLK. Specifically, for example, the reference timer 112 may output the reference interrupt signal REF_INTRT whenever the reference interrupt period arrives based on the reference clock signal REF_CLK.

In an embodiment, the reference timer 112 may be implemented as a counter that counts the number of times the clock signal is toggled. Specifically, for example, the reference timer 112 may count the number of times the reference clock signal REF_CLK is toggled (for example, during a reference interrupt period). In addition, when a first count value indicating the number of times the reference clock signal REF_CLK is toggled reaches a preset first reference count value, the reference timer 112 may output the reference interrupt signal REF_INTRT at a time point when the reference interrupt period (for example, the next reference interrupt period) is reached. In the inventive concept, the reference timer 112 may be referred to as a reference counter.

Figure 3:
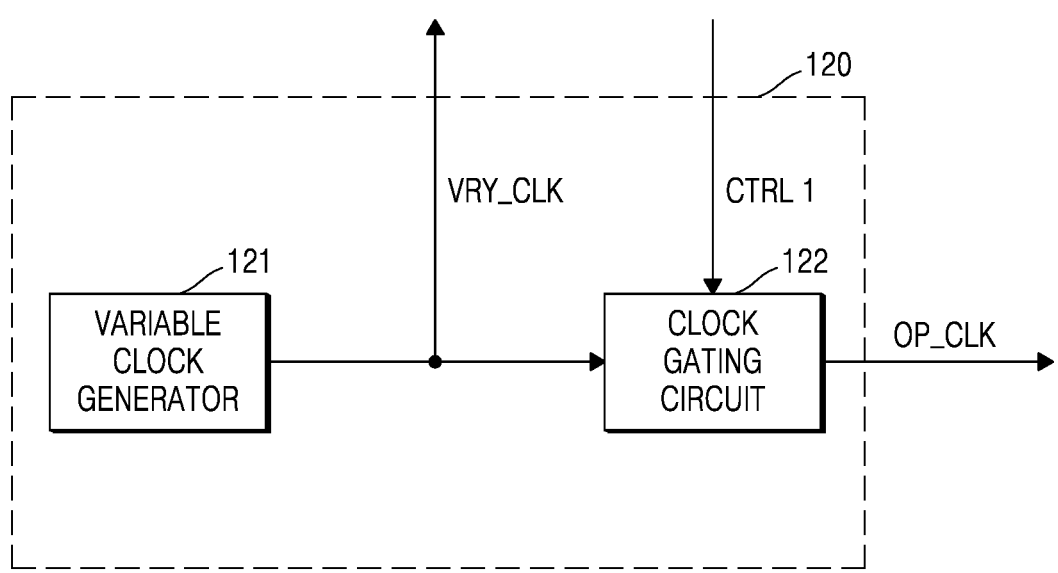
FIG. 3 is a block diagram illustrating a variable clock manager according to an example embodiment of the inventive concept.

FIG. 3 is a block diagram illustrating a variable clock manager according to an example embodiment of the inventive concept.

Referring to FIG. 3, the variable clock manager 120 may include a variable clock generator 121 and a clock gating circuit 122.

The variable clock generator 121 may output a variable clock signal VRY_CLK. When power is supplied to a system-on-chip, the variable period and clock frequency of the variable clock signal VRY_CLK may be initialized to an optimized value in order for the logic circuit to operate normally. The variable clock signal VRY_CLK may be provided to the variable interrupt generator 130 and the clock gating circuit 122.

The clock gating circuit 122 may output the variable clock signal VRY_CLK as the operating clock signal OP_CLK according to the first control signal CTRL 1 or may interrupt the output of the operating clock signal OP_CLK. For example, when the first control signal CTRL 1 has the first logic value, the clock gating circuit 122 may output the variable clock signal VRY_CLK as the operating clock signal OP_CLK. As another example, when the first control signal CTRL 1 has the second logic value, the clock gating circuit 122 may interrupt the output of the operating clock signal OP_CLK. Here, the interrupting of the output of the operating clock signal OP_CLK may be because, for example, a logic value of the operating clock signal OP_CLK may be the second logic value, but is not limited thereto.

Figure 4:
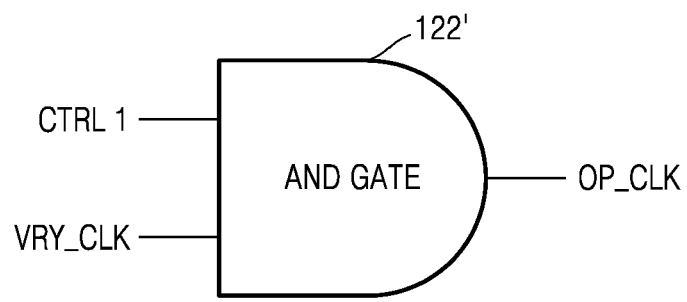
FIG. 4 is a diagram illustrating a circuit for implementing a clock gating circuit illustrated in FIG. 3 according to an example embodiment.

FIG. 4 is a diagram illustrating a circuit for implementing a clock gating circuit illustrated in FIG. 3 according to an example embodiment.

Referring to FIGS. 3 and 4, in an embodiment, the clock gating circuit 122 illustrated in FIG. 3 may be implemented as a logic product gate 122' (or AND gate).

The logic product gate 122' may receive the first control signal CTRL 1 and the variable clock signal VRY_CLK. In addition, the logic product gate 122' may perform a logic product operation on the logic value of the first control signal CTRL 1 and the logic value of the variable clock signal VRY_CLK. The logic product gate 122' may output the result of the logic product operation as the operating clock signal OP_CLK. According to the logic product operation, the result of the logic product operation may be the first logic value only in the case that both logic values of the input signals are the first logic value, and in other cases, the result of the logic product operation may be the second logic value.

Figure 5:
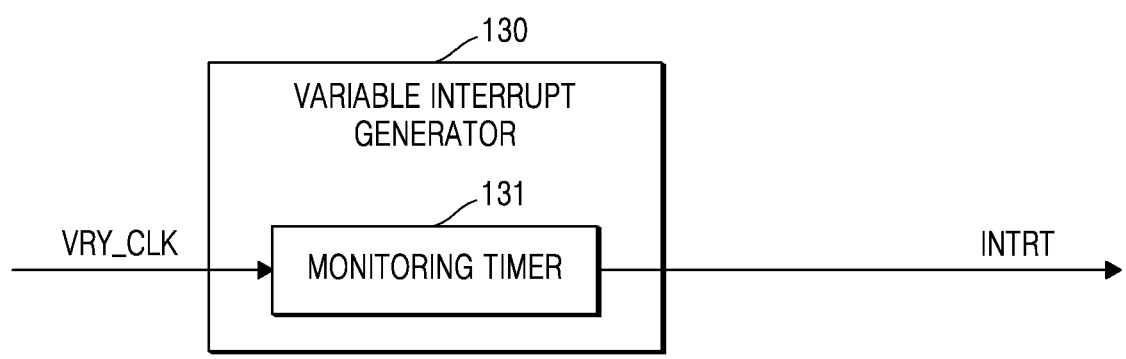
FIG. 5 is a block diagram illustrating a variable interrupt generator according to an example embodiment of the inventive concept.

FIG. 5 is a block diagram illustrating a variable interrupt generator according to an example embodiment of the inventive concept.

Referring to FIG. 5, the variable interrupt generator 130 may include a monitoring timer 131. Alternatively, the variable interrupt generator 130 may be implemented as the monitoring timer 131.

The monitoring timer 131 may output the interrupt signal INTRT every variable interrupt period. The variable interrupt period may be changed according to a variable period of the variable clock signal VRY_CLK. For example, when the variable period of the variable clock signal VRY_CLK increases, the variable interrupt period also increases, and when the variable period of the variable clock signal VRY_CLK decreases, the interrupt period may also decrease. However, they are not limited thereto.

In an embodiment, the monitoring timer 131 may generate time information based on the clock source. Here, the clock source may be, for example, the variable clock signal VRY_CLK. Specifically, for example, the monitoring timer 131 may output the interrupt signal INTRT whenever the variable interrupt period arrives based on the variable clock signal VRY_CLK.

In an embodiment, the monitoring timer 131 may be implemented as a counter. Specifically, for example, the monitoring timer 131 may count the number of times the variable clock signal VRY_CLK is toggled (for example, during a variable interrupt period). In addition, when a second count value indicating the number of times the variable clock signal VRY_CLK is toggled reaches a preset second reference count value, the monitoring timer 131 may output the interrupt signal INTRT at a point in time when the variable interrupt period (for example, the next variable interrupt period) is reached. In the inventive concept, the monitoring timer 131 may be referred to as a monitoring counter.

Figure 6A:
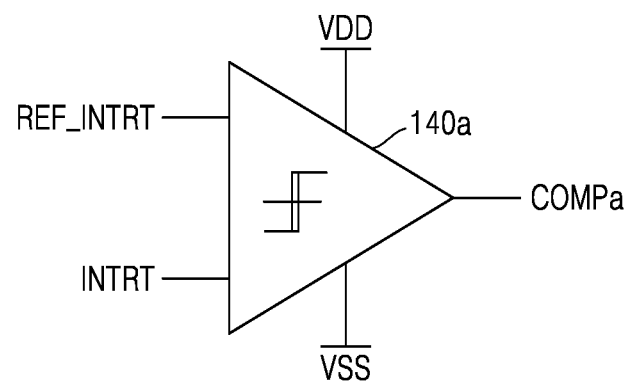
FIGS. 6A and 6B are diagrams illustrating a circuit for implementing a comparison circuit according to example embodiments of the inventive concept, respectively.
Figure 6B:
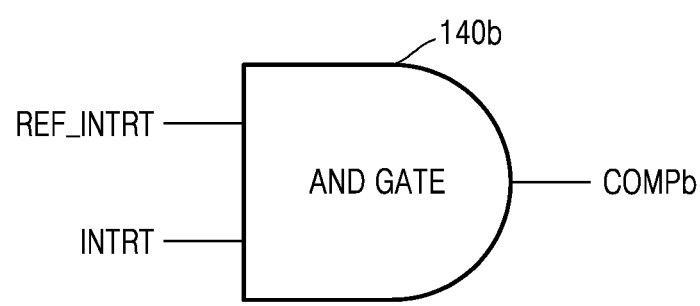

FIGS. 6A and 6B are diagrams illustrating a circuit for implementing a comparison circuit according to example embodiments of the inventive concept, respectively.

Referring to FIGS. 1 and 6A, the comparison circuit 140 illustrated in FIG. 1 may be implemented as a comparator 140a. The comparator 140a may receive the reference interrupt signal REF_INTRT and the interrupt signal INTRT as inputs. The comparator 140a may receive a first power VDD and a second power VSS to compare the reference interrupt signal REF_INTRT to the interrupt signal INTRT, and output a comparison result signal COMPa indicating a comparison result. In an embodiment, when the amplitude of the interrupt signal INTRT is the same as that of the reference interrupt signal REF_INTRT, a comparison result signal having the first logic value may be output. For example, when the amplitude of the interrupt signal INTRT is the same as that of the reference interrupt signal REF_INTRT as the first logic level, the comparison result signal COMPa having the first logic value may be output. In an embodiment, when the amplitude of the interrupt signal INTRT is different from that of the reference interrupt signal REF_INTRT, the comparison result signal COMPa having the second logic value may be output.

Referring to FIGS. 1 and 6B, the comparison circuit 140 illustrated in FIG. 1 may be implemented as a logic product gate (140b or AND gate). The logic product gate 140b may receive the reference interrupt signal REF_INTRT and the interrupt signal INTRT as inputs. In addition, the logic product gate 140b may perform a logic product operation on a logic value of the reference interrupt signal REF_INTRT and a logic value of the interrupt signal INTRT. The logic product gate 140b may output the result of the logic product operation as a comparison result signal COMPb. In an embodiment, when the logic value of the reference interrupt signal REF_INTRT and the logic value of the interrupt signal INTRT are the same as the first logic value, the comparison result signal COMPb having the first logic value may be output. In an embodiment, when the logic value of the reference interrupt signal REF_INTRT is different from the logic value of the interrupt signal INTRT, the comparison result signal COMPb having the second logic value may be output.

FIGS. 7A and 7B are waveform diagrams illustrating a circuit for implementing a comparison circuit according to example embodiments of the inventive concept, respectively. Specifically, FIG. 7A is a diagram illustrating timing of signals that may be output from the malicious attack protection circuit 100 when there is no malicious user attack, and FIG. 7B is a diagram illustrating timing of signals that may be output from the malicious attack protection circuit 100 when there is a malicious user attack.

Referring to FIGS. 1 to 4 and 7A, in an embodiment, the reference interrupt period REF_INTRT_PRD may be the least common multiple of an initial variable period INI_VRY_PRD and a reference period REF_PRD of a reference clock signal REF_CLK, which are initially set in the variable clock manager 120. For example, when the reference period REF_PRD of the reference clock signal REF_CLK is 2 seconds, and the initial variable period INI_VRY_PRD of the variable clock signal VRY_CLK is 3 seconds, the reference interrupt period REF_INTRT_PRD may be 6 seconds, which is the least common multiple of 2 and 3. However, they are not limited thereto. For convenience of description, it is assumed that the reference period REF_PRD of the reference clock signal REF_CLK is 2 seconds and the initial variable period INI_VRY_PRD of the variable clock signal VRY_CLK is 3 seconds.

Since the reference interrupt period REF_INTRT_PRD may be the least common multiple of the reference period REF_PRD of the reference clock signal REF_CLK and the initial variable period INI_VRY_PRD of the variable clock signal VRY_CLK, the reference interrupt period REF_INTRT_PRD may be an integer multiple of the reference period REF_PRD of the reference clock signal REF_CLK or an integer multiple of the initial variable period INI_VRY_PRD of the variable clock signal VRY_CLK. For example, the reference interrupt period REF_INTRT_PRD may be three times the reference period REF_PRD of the reference clock signal REF_CLK. Alternatively, the reference interrupt period REF_INTRT_PRD may be twice the initial variable period INI_VRY_PRD of the variable clock signal VRY_CLK. However, they are not limited thereto.

The reference timer 112 may count the number of times the reference clock signal REF_CLK is toggled. For example, the reference timer 112 may increase the count value once whenever the reference clock signal REF_CLK has the second logic value, the first logic value, and the second logic value sequentially. A first count value indicating the number of times the reference clock signal REF_CLK is toggled may reach a preset first reference count value. In this case, the first reference count value may be the number of times the reference clock signal REF_CLK is toggled during the reference interrupt period REF_INTRT_PRD. For example, since the number of times the reference clock signal REF_CLK is toggled is three during the reference interrupt period REF_INTRT_PRD, the first reference count value may be 3. However, they are not limited thereto. When the first count value satisfies the first reference count value, the reference timer 112 may output the reference interrupt signal REF_INTRT at a point in time when the reference interrupt period REF_INTRT_PRD is reached. For example, when the first count value reaches 3, the reference timer 112 may be synchronized at a point in time when the reference interrupt period REF_INTRT_PRD is reached to output the reference interrupt signal REF_INTRT in the form of a pulse.

The monitoring timer 131 may count the number of times the variable clock signal VRY_CLK is toggled. A second count value indicating the number of times the variable clock signal VRY_CLK is toggled may reach a preset second reference count value. The second reference count value may be the number of times the variable clock signal VRY_CLK is toggled with the initial variable period INI_VRY_PRD during the reference interrupt period REF_INTRT_PRD. For example, since the number of times the variable clock signal VRY_CLK is toggled is 2 during the reference interrupt period REF_INTRT_PRD, the second reference count value may be 2. However, they are not limited thereto. When the second count value satisfies the second reference count value, the monitoring timer 131 may output the interrupt signal INTRT at a point in time when the variable interrupt period VRY_INTRT_PRD is reached. For example, when the second count value becomes 2, the monitoring timer 131 may be synchronized at a point in time when the variable interrupt period VRY_INTRT_PRD is reached to output a pulse-type interrupt signal INTRT. The variable interrupt period VRY_INTRT_PRD may be an integer multiple of the variable period of the variable clock signal VRY_CLK. In this case, the integer multiple of the variable period of the variable clock signal VRY_CLK corresponds to a ratio relationship between the reference interrupt period REF_INTRT_PRD and the initial variable period INI_VRY_PRD. For example, since the reference interrupt period REF_INTRT_PRD is twice the initial variable period INI_VRY_PRD, the variable interrupt period VRY_INTRT_PRD may be twice the variable period of the variable clock signal VRY_CLK. In the case of FIG. 7A, the variable interrupt period VRY_INTRT_PRD may be the same as the reference interrupt period REF_INTRT_PRD. When the variable clock generator 121 outputs the variable clock signal VRY_CLK at the initial variable period INI_VRY_PRD, the monitoring timer 131 may output the interrupt signal INTRT every reference interrupt period REF_INTRT_PRD.

When the logic value of the reference interrupt signal REF_INTRT and the logic value of the interrupt signal INTRT are both the first logic value, the comparison circuit 140 may output a pulse-type comparison result signal COMP having the first logic value.

The crypto controller 150 may monitor the logic value of the comparison result signal COMP every reference interrupt period REF_INTRT_PRD. When the logic value of the comparison result signal COMP is the first logic value, the crypto controller 150 may output the first control signal CTRL 1 having the first logic value. However, they are not limited thereto.

When the logic value of the first control signal CTRL 1 is the first logic value, the clock gating circuit 122 (e.g., the logic product gate 122') may output the variable clock signal VRY_CLK as the operating clock signal OP_CLK. In this case, the operating clock signal OP_CLK may be the same as the variable clock signal VRY_CLK.

Referring to FIGS. 1 to 4 and 7B, a malicious user may attack the variable clock generator 121. In this case, the variable period VRY_PRD of the variable clock signal VRY_CLK may be changed. For example, when the initial variable period INI_VRY_PRD is 3 seconds, the variable period VRY_PRD may be changed from 3 seconds to 2 seconds. However, they are not limited thereto. When the variable period VRY_PRD is changed, the variable interrupt period VRY_INTRT_PRD may also be changed. For example, the variable interrupt period VRY_INTRT_PRD may be changed from 6 seconds to 4 seconds. Meanwhile, the second reference count value may not be changed.

When the second count value becomes 2 (second reference count value), the interrupt signal INTRT may be output at a point in time when the variable interrupt period VRY_INTRT_PRD is reached. As the variable interrupt period VRY_INTRT_PRD is changed, the timing at which the reference interrupt signal REF_INTRT is output and the timing at which the interrupt signal INTRT is output may be different from each other. Accordingly, unlike FIG. 7A, a logic value of the reference interrupt signal REF_INTRT and a logic value of the interrupt signal INTRT may be different from each other at a point in time when the first reference interrupt period REF_INTRT_PRD is reached. In this case, the comparison circuit 140 may output the comparison result signal COMP having the second logic value or may not output the comparison result signal COMP. Herein, the not outputting of the comparison result signal COMP may mean that an output state of the comparison circuit 140 is Hi-Z state or don't care state.

When the logic value of the comparison result signal COMP is the second logic value at a point in time when the reference interrupt period REF_INTRT_PRD arrives, the crypto controller 150 may output the first control signal CTRL 1 having the second logic value in response to the comparison result signal COMP having the second logic value. In this case, it is assumed that before a malicious user attacks the variable clock generator 121, the logic value of the comparison result signal COMP is the first logic value at a point in time when the reference interrupt period REF_INTRT_PRD arrives, the crypto controller 150 may output the first control signal CTRL 1 having the first logic value at a time point $T_0$ in response to the comparison result signal COMP having the first logic value. In addition, the crypto controller 150 may output the second control signal CTRL 2 in response to the comparison result signal COMP having the second logic value at the point in time when the reference interrupt period REF_INTRT_PRD arrives.

The output of the operating clock signal OP_CLK may be interrupted from the point in time when the logic value of the first control signal CTRL 1 becomes the second logic value. In an embodiment, in order to enhance security and reliability, the operating clock signal OP_CLK may continue to have the second logic value from the point in time when the logic value of the first control signal CTRL 1 becomes the second logic value. In another embodiment, the operating clock signal OP_CLK may have the second logic value only during a period in which the logic value of the first control signal CTRL 1 is the second logic value.

Figure 8:
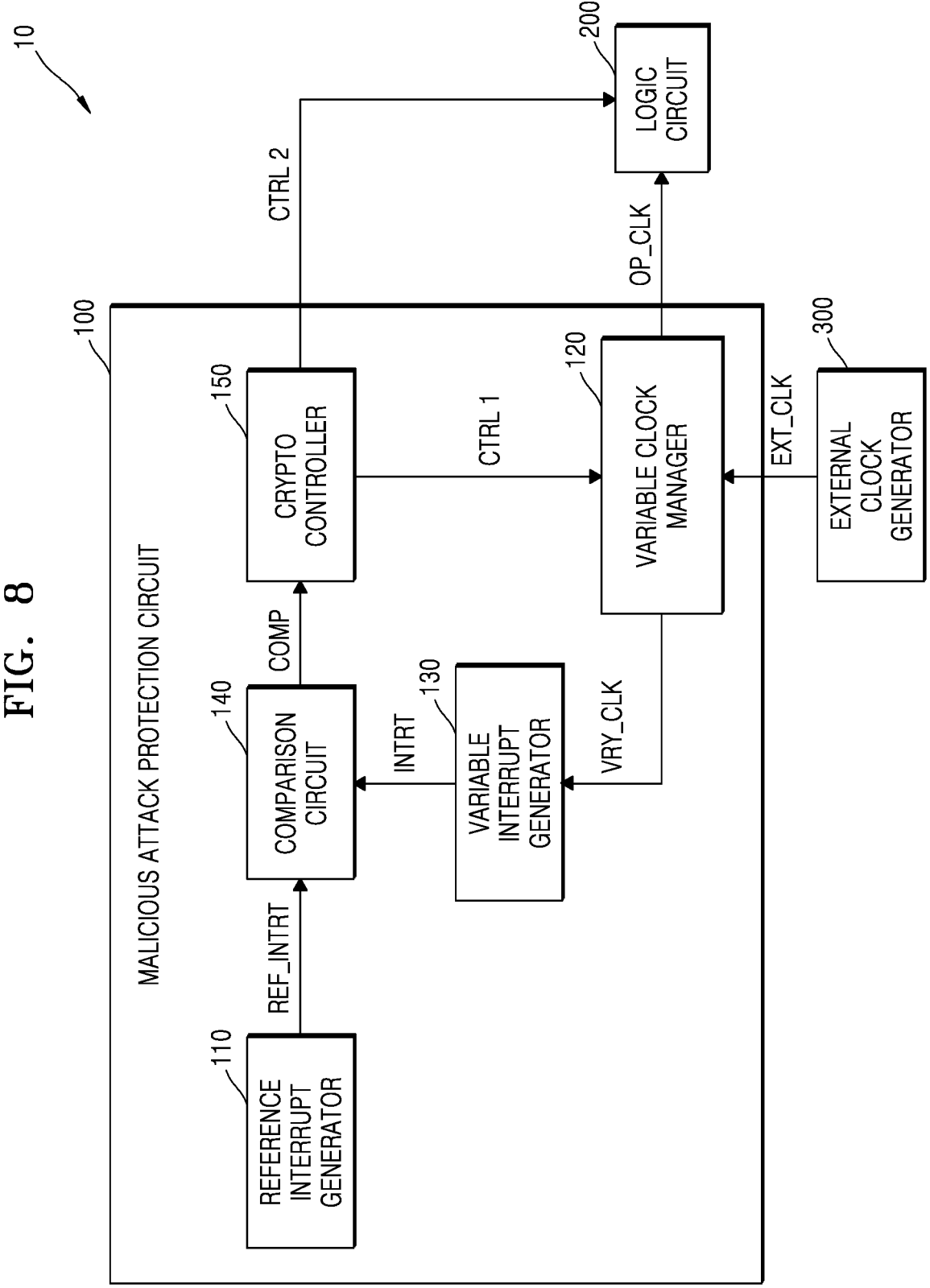
FIG. 8 is a block diagram illustrating a system-on-chip according to an example embodiment of the inventive concept.

FIG. 8 is a block diagram illustrating a system-on-chip according to an example embodiment of the inventive concept.

Referring to FIGS. 3 and 8, the system-on-chip 10 may be a technology-intensive semiconductor including the entire system in one chip. That is, the system-on-chip 10 may be implemented with a system composed of devices having various functions as a single chip. When devices having multiple functions are integrated into one chip, the product may be miniaturized, and manufacturing costs may be reduced, compared to semiconductors having each function separately manufactured. The system-on-chip 10 may receive power (or external supply voltage) from the outside to perform various functions.

The system-on-chip 10 may include a malicious attack protection circuit 100, a logic circuit 200, and an external clock generator 300.

The malicious attack protection circuit 100 may perform the operation described above with reference to FIG. 1.

According to an embodiment, the variable clock generator 121 may receive an external clock signal EXT_CLK as an input, and output a variable clock signal VRY_CLK as an output. Specifically, the variable clock generator 121 may output the variable clock signal VRY_CLK by changing the external clock signal EXT_CLK to a variable clock signal VRY_CLK having a preset variable period VRY_PRD. However, the variable clock generator 121 is not limited thereto, and the variable clock generator 121 may output the variable clock signal VRY_CLK by itself without receiving the external clock signal EXT_CLK.

The logic circuit 200 may perform an overall operation in response to the operating clock signal OP_CLK in the normal mode. For example, in the normal mode, the logic circuit 200 may process data input to the logic circuit 200 in response to toggling of the operating clock signal OP_CLK and output the processed data. The logic circuit 200 may perform a preset operation in the malfunction mode. For example, in the malfunction mode, the logic circuit 200 may output dummy data, such as unreadable data and randomized data, in response to toggling of the operating clock signal OP_CLK.

The external clock generator 300 may output the external clock signal EXT_CLK.

Figure 9:
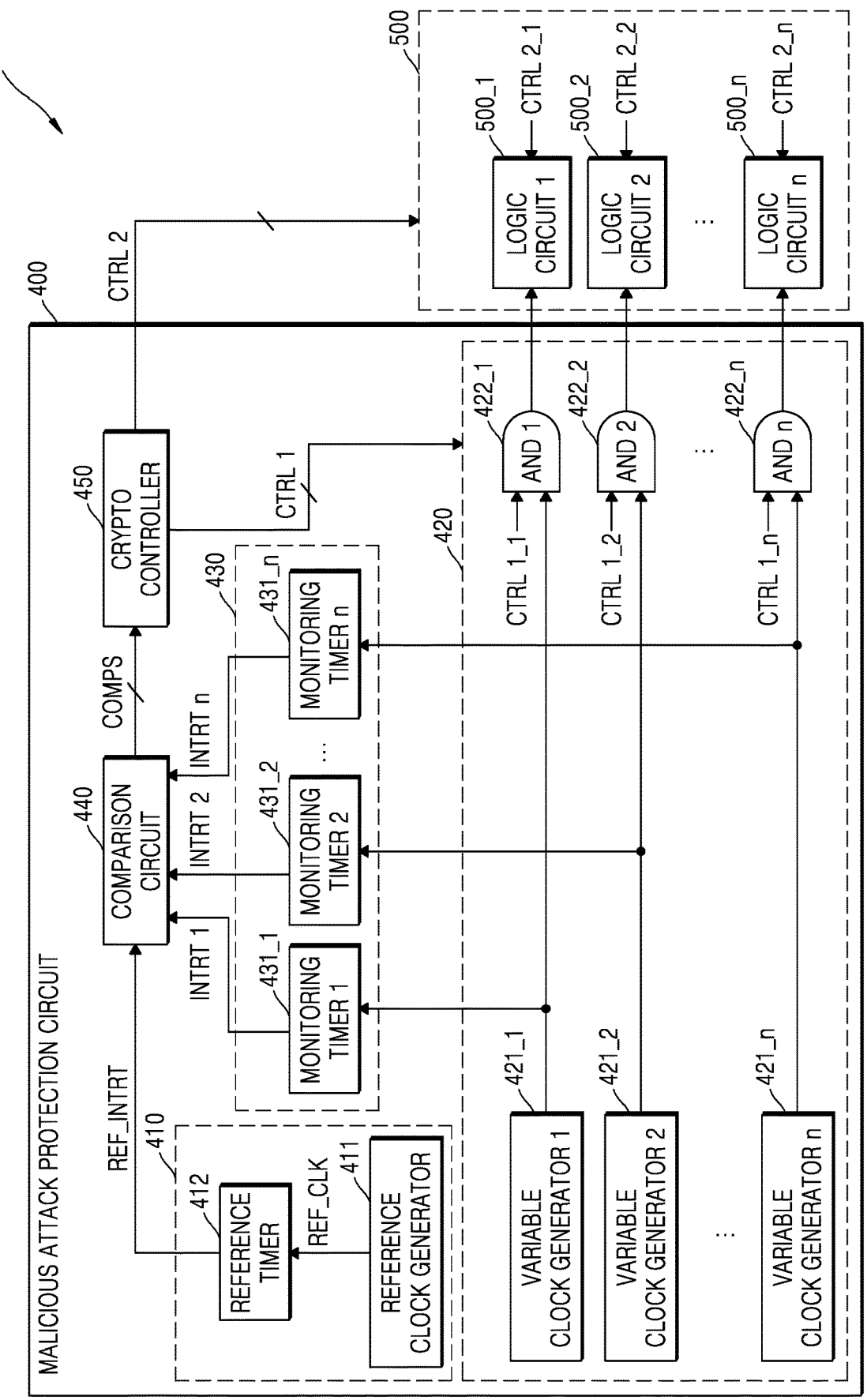
FIG. 9 is a block diagram illustrating a system-on-chip according to an example embodiment of the inventive concept.

FIG. 9 is a block diagram illustrating a system-on-chip according to an example embodiment of the inventive concept.

Referring to FIG. 9, a system-on-chip 20 according to an example embodiment of the inventive concept may include a malicious attack protection circuit 400 and a logic circuit group 500.

The malicious attack protection circuit 400 may perform an operation similar to the malicious attack protection circuit 100 shown in FIG. 1. The malicious attack protection circuit 400 may include a reference interrupt generator 410, a variable clock manager 420, a variable interrupt generator 430, a comparison circuit 440, and a crypto controller 450.

The reference interrupt generator 410 may include a reference clock generator 411 and a reference timer 412. The reference interrupt generator 410 may perform an operation the same as the operation of the reference interrupt generator 110 described above with reference to FIGS. 1 and 2.

The variable clock manager 420 may include first to nth variable clock generators 421_1, 421_2, ..., and 421_n, and first to nth clock gating circuits 4221, 422_2, ..., and 422_n. Here, n may be an integer equal to or greater than 2. The variable clock manager 420 may perform an operation similar to the variable clock manager 120 described above with reference to FIGS. 1 and 3.

Each of the first to nth variable clock generators 421_1, 421_2, ..., and 421_n may output a variable clock signal in a preset initial variable period. In this case, the initial variable periods may be the same as or different from each other in the first to nth variable clock generators 421_1, 421_2, ..., and 421_n. The variable clock signal output by the first variable clock generator 421_1 may be input to the first monitoring timer 431_1 and the first clock gating circuit 422_1. The variable clock signal output by the second variable clock generator 421_2 may be input to the second monitoring timer 431_2 and the second clock gating circuit 4222. Likewise, the variable clock signal output by the n-th variable clock generator 421_n may be input to the n-th monitoring timer 431_n and the n-th clock gating circuit 422_n.

Each of the first to nth clock gating circuits 422_1, 422_2, ..., and 422_n may perform a logic product operation between the variable clock signal and the first control signal CTRL 1. For example, the first clock gating circuit 422_1 may perform a logic product operation between the variable clock signal output from the first variable clock generator 421_1 and a corresponding first control signal CTRL 1_1. The second clock gating circuit 422_2 may perform a logic product operation between the variable clock signal output from the second variable clock generator 421_2 and a corresponding first control signal CTRL 1_2. Likewise, the nth clock gating circuit 422_n may perform a logic product operation between the variable clock signal output from the nth variable clock generator 421_n and a corresponding first control signal CTRL 1_n. Each of the first to nth clock gating circuits 422_1, 422_2, ..., and 422_n may be implemented as a logic product gate.

The variable interrupt generator 430 may include first to nth monitoring timers 431_1, 431_2, ..., and 431_n. The first to nth monitoring timers 431_1, 431_2, ..., and 431_n may output first to nth interrupt signals INTRT 1, INTRT 2, ..., and INTRT n based on the corresponding variable clock signals, respectively. The variable interrupt generator 430 may perform an operation similar to the variable interrupt generator 130 described above with reference to FIGS. 1 and 5.

The comparison circuit 440 may compare the reference interrupt signal REF_INTRT with each of the first to n-th interrupt signals INTRT 1, INTRT 2, ..., and INTRT n. For example, the comparison circuit 440 may compare the reference interrupt signal REF_INTRT with the first interrupt signal INTRT 1, compare the reference interrupt signal REF_INTRT with the second interrupt signal INTRT 2, and compare the reference interrupt signal REF_INTRT with the nth interrupt signal INTRT n. However, the comparison circuit 440 is not limited thereto, and the comparison circuit 440 may compare a logic value calculated by logic-product-operating the first to nth interrupt signals INTRT 1, INTRT 2, ..., and INTRT n with a logic value of the reference interrupt signal REF_INTRT. The comparison circuit 440 may output at least one comparison result signal COMPS. When the reference interrupt signal REF_INTRT and each interrupt signal are compared on a one-to-one basis, the comparison circuit 440 may output first to n-th comparison result signals. The comparison circuit 440 may perform an operation similar to the comparison circuit 140 described above with reference to FIGS. 1 and 6A or 6B.

The crypto controller 450 may output at least one control signal of the first control signal CTRL 1 and the second control signal CTRL 2 according to the logic value of the corresponding comparison result signal. For example, the crypto controller 450 may output at least one control signal of the corresponding first control signal CTRL 1_1 and the second control signal CTRL 2_1 according to a logic value of the first comparison result signal indicating a comparison result between the reference interrupt signal REF_INTRT and the first interrupt signal INTRT 1, or may not output the at least one control signal. Herein, the not outputting of the at least one control signal may mean that an output state of the crypto controller 450 is Hi-Z state or don't care state. The first control signal CTRL 1_1 may be input to the first clock gating circuit 422_1, and the second control signal CTRL 2_1 may be input to a first logic circuit 500_1.

The logic circuit group 500 may include first to nth logic circuits 500_1, 500_2, ..., and 500_n. Each of the first to n-th logic circuits 500_1, 500_2, ..., and 500_n may perform an operation similar to the logic circuit 200 described above with reference to FIG. 8. The operating clock signals for performing a general operation in a normal mode may be the same as or different from each other in the first to nth logic circuits 500_1, 500_2, ..., and 500_n.

Figure 10A:
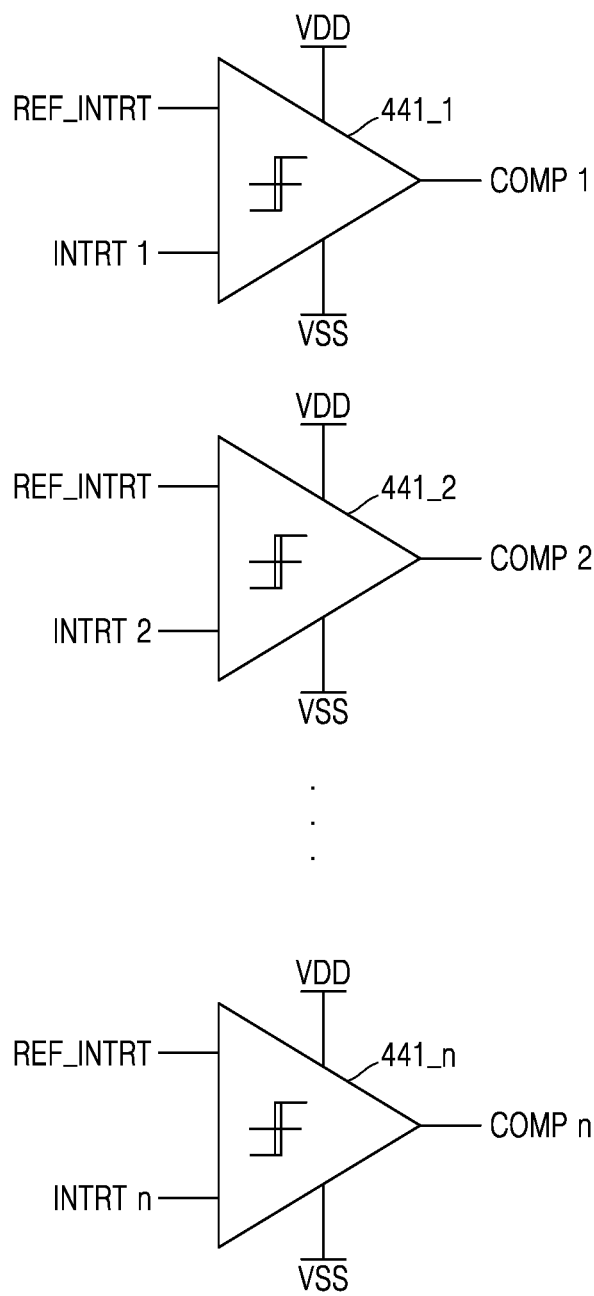
FIGS. 10A and 10B are diagrams illustrating a circuit for implementing a comparison circuit according to example embodiments of the inventive concept, respectively.
Figure 10B:
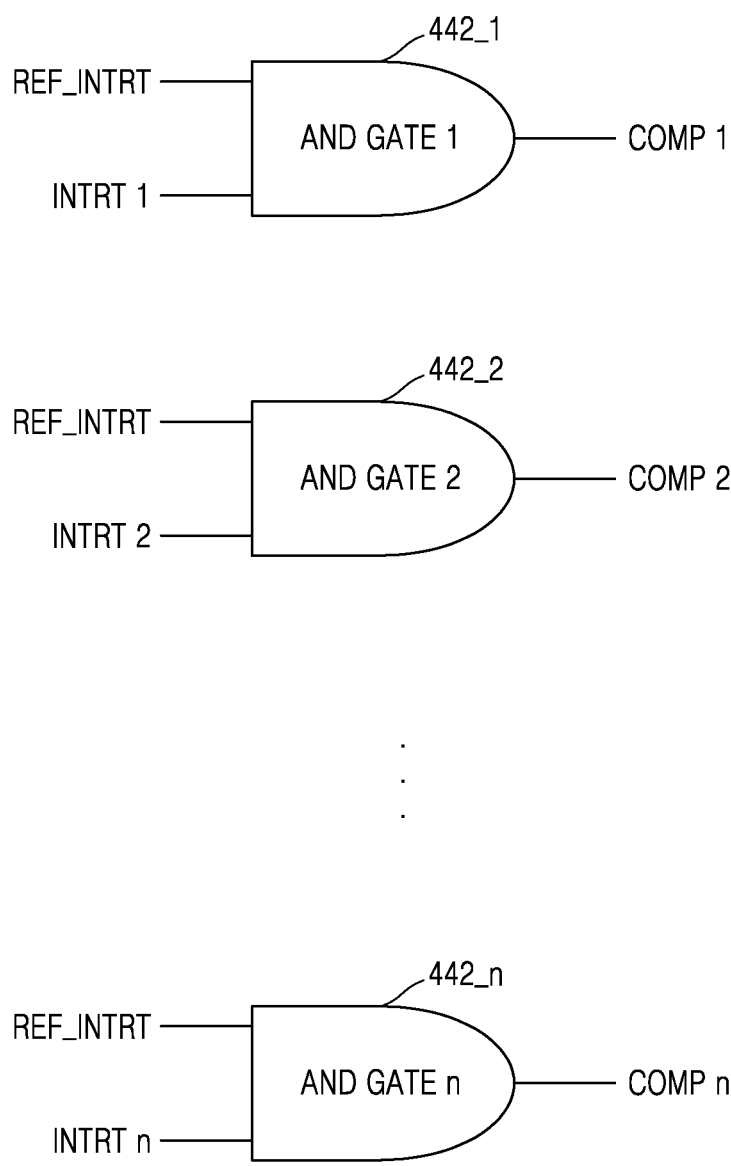

FIGS. 10A and 10B are diagrams illustrating a circuit for implementing a comparison circuit according to example embodiments of the inventive concept, respectively.

Referring to FIGS. 9 and 10A, the comparison circuit 440 according to an example embodiment of the present invention may be implemented as first to n-th comparators 441_1, 441_2, ..., and 441_n. Each of the first to n-th comparators 441_1, 441_2, ..., and 441_n may perform an operation the same as the operation of the comparator 140a described above with reference to FIG. 6A.

The first comparator 441_1 may compare the reference interrupt signal REF_INTRT with the first interrupt signal INTRT 1 and output the first comparison result signal COMP 1. The first comparison result signal COMP 1 may be related to a first control signal CTRL 1_1 input to the first clock gating circuit 422_1 and/or a second control signal CTRL 2_1 input to the first logic circuit 500_1.

The second comparator 441_2 may compare the reference interrupt signal REF_INTRT with the second interrupt signal INTRT 2 and output the second comparison result signal COMP 2. The second comparison result signal COMP 2 may be related to the first control signal CTRL 1_2 input to the second clock gating circuit 422_2 and/or the second control signal CTRL 2_2 input to the second logic circuit 500_2.

Likewise, the n-th comparator 441_n may compare the reference interrupt signal REF_INTRT with the n-th interrupt signal INTRT n and output the n-th comparison result signal COMP n. The n-th comparison result signal COMP n may be related to a first control signal CTRL 1_n input to the n-th clock gating circuit 422_n and/or a second control signal CTRL 2_n input to the n-th logic circuit 500_n.

Referring to FIGS. 9 and 10B, the comparison circuit 440 may be implemented as first to n-th logic product gates 442_1, 442_2, . . . , and 442_n. Each of the first to n-th logic product gate 442_1, 442_2, . . . , and 442_n may perform an operation the same as the operation of the logic product gate 140b described above with reference to FIG. 6B.

The first logic product gate 442_1 may output the first comparison result signal COMP 1 by performing a logic product operation on the logic value of the reference interrupt signal REF_INTRT and the logic value of the first interrupt signal INTRT 1. The second logic product gate 442_2 may output the second comparison result signal COMP 2 by performing a logic product operation on the logic value of the reference interrupt signal REF_INTRT and the logic value of the second interrupt signal INTRT 2. Likewise, the n-th logic product gate 442_n may output the nth comparison result signal COMP n by performing a logic product operation on the logic value of the reference interrupt signal REF_INTRT and the logic value of the n-th interrupt signal INTRT n.

Figure 11:
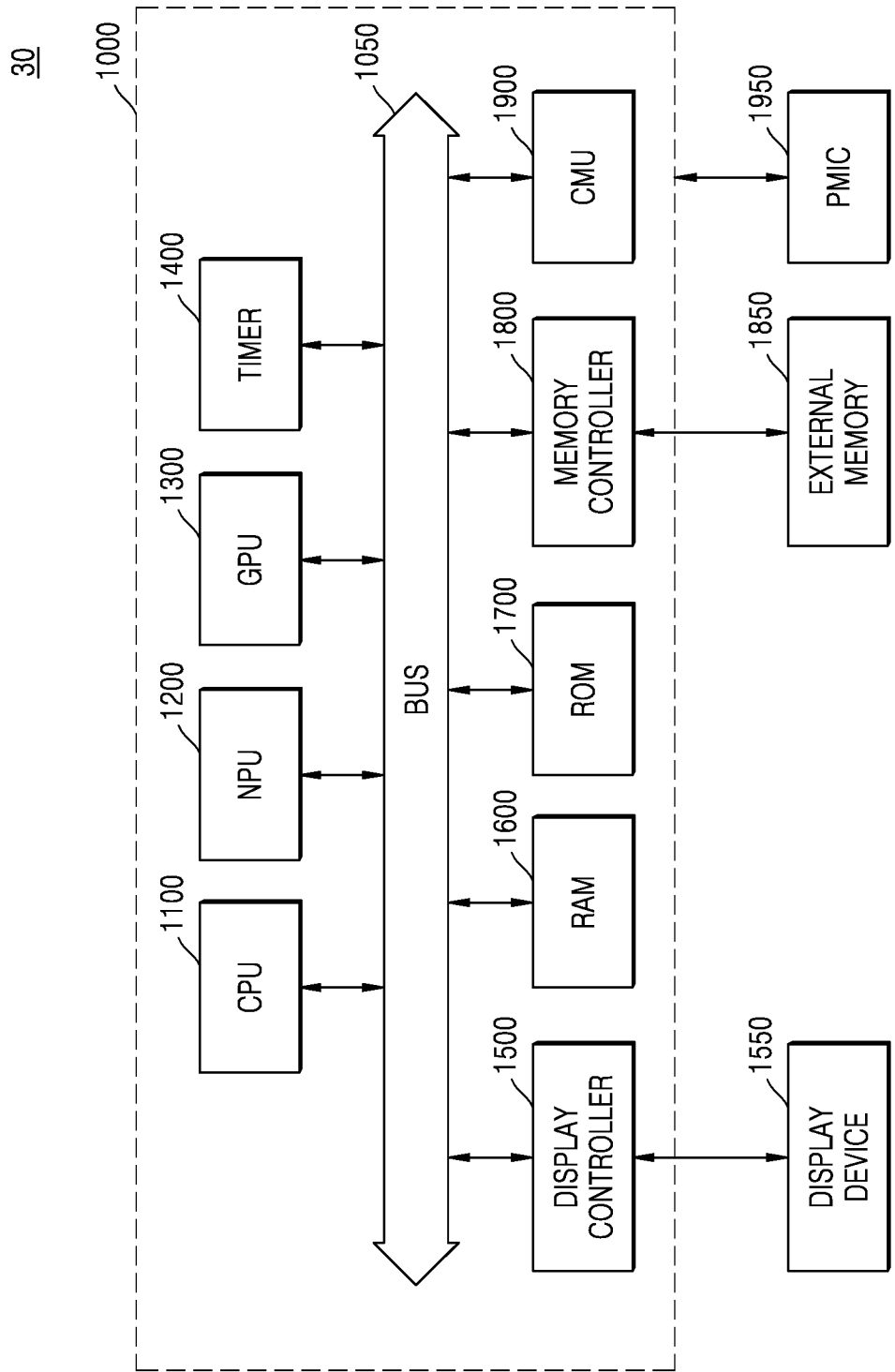
FIG. 11 is a block diagram illustrating an electronic device according to an example embodiment of the inventive concept.

FIG. 11 is a block diagram illustrating an electronic device according to an example embodiment of the inventive concept.

Referring to FIG. 11, the electronic device 30 may be implemented as a handheld device, such as a mobile phone, a smartphone, a tablet personal computer (PC), a personal digital assistant (PDA), an enterprise digital assistant (EDA), a digital still camera, a digital video camera, a portable multimedia player (PMP), a personal navigation derive or portable navigation device (PND), a handheld game console, or an e-book.

The electronic device 30 may include a system-on-chip 1000, an external memory 1850, a display device 1550, and a power management integrated circuit (PMIC) 1950.

The system-on-chip 1000 may include a central processing unit (CPU) 1100, a neural processing unit (NPU) 1200, a graphics processing unit (GPU) 1300, a timer 1400, a display controller 1500, random access memory (RAM) 1600, read only memory (ROM) 1700, a memory controller 1800, a clock management unit (CMU) 1900, and a bus 1050. In example embodiments, the system-on-chip 1000 may include the malicious attack protection circuit 100 or 400 described above with reference to FIGS. 1 and 9, respectively. The system-on-chip 1000 may further include other components than the components shown. For example, the electronic device 30 may further include the display device 1550, the external memory 1850, and the PMIC 1950. The PMIC 1950 may be implemented outside the system-on-chip 1000. However, the system-on-chip 1000 is not limited thereto, and the system-on-chip 1000 may include a power management unit (PMU) capable of performing a function of the PMIC 1950. The system-on-chip 1000 may perform an operation similar to the system-on-chip 10 described above with reference to FIG. 1.

The CPU 1100 may also be referred to as a processor, and may process or execute programs and/or data stored in the external memory 1850. For example, the CPU 1100 may process or execute programs and/or data in response to an operating clock signal output from the CMU 1900.

The CPU 1100 may be implemented as a multi-core processor. The multi-core processor is a computing component with two or more independent practical processors (called cores), each of which may read and execute program instructions. Programs and/or data stored in the ROM 1700, the RAM 1600, and/or the external memory 1850 may be loaded into a memory of the CPU 1100 as necessary.

The CPU 1100 may initialize the timer 1400 based on boot-code stored in the ROM 1700. The period of the initialized timer 1400 may be set to a preset initial value. In addition, the CPU 1100 may control the malicious attack protection circuit 100 or 400 described above with reference to FIGS. 1 and 9, respectively. For example, the CPU 1100 may initialize the reference timer 112, the variable clock generator 121, and the monitoring timer 131 of the malicious attack protection circuit 100 described above with reference to FIG. 1 based on the boot-code. The reference interrupt period REF_INTRT_PRD, the first reference count value, and the like of the initialized reference timer 112 may be set to initial values. The initial variable period or the like of the initialized variable clock generator 121 may be set to an initial value. The variable interrupt period, the second reference count value, and the like of the initialized monitoring timer 131 may be set as initial values.

The NPU 1200 may efficiently process large-scale operations using an artificial neural network. The NPU 1200 may perform deep learning by supporting multiple simultaneous matrix operations.

The GPU 1300 may convert data read from the external memory 1850 by the memory controller 1800 into a signal suitable for the display device 1550.

The timer 1400 may output a count value indicating a time based on the operating clock signal output from the CMU 1900.

The display device 1550 may display image signals output from the display controller 1500. For example, the display device 1550 may be implemented as a liquid crystal display (LCD), a light emitting diode (LED) display, an organic LED (OLED) display, an active-matrix OLED (AMOLED) display, or a flexible display. The display controller 1500 may control the operation of the display device 1550.

The RAM 1600 may temporarily store programs, data, or instructions. For example, programs and/or data stored in the memory may be temporarily stored in the RAM 1600 under the control of the CPU 1100 or the boot-code stored in the ROM 1700. The RAM 1600 may be implemented as dynamic RAM (DRAM) or static RAM (SRAM).

The ROM 1700 may store permanent programs and/or data. The ROM 1700 may be implemented as erasable programmable read-only memory (EPROM) or electrically erasable programmable read-only memory (EEPROM).

The memory controller 1800 may communicate with the external memory 1850 through an interface. The memory controller 1800 controls overall operations of the external memory 1850, and controls data exchange between the host and the external memory 1850. For example, the memory controller 1800 may write data to the external memory 1850 or read data from the external memory 1850 according to a request from the host. Here, the host may be a master device, such as the CPU 1100, the GPU 1300, or the display controller 1500.

The external memory 1850 is a storage medium for storing data and may store an operating system (OS), various programs, and/or various types of data. The external memory 1850 may be a nonvolatile memory device (e.g., flash memory, phase change RAM (PRAM), magnetic RAM (MRAM), resistive RAM (RRAM), or an FeRAM device, but is not limited thereto. In another embodiment of the inventive concept, the external memory 1850 may be provided inside the system-on-chip 1000. In addition, the external memory 1850 may be flash memory, an embedded multimedia card (eMMC), or a universal flash storage (UFS).

The CMU 1900 generates an operating clock signal. The CMU 1900 may include a clock signal generation device, such as a phase locked loop (PLL), a delayed locked loop (DLL), or a crystal oscillator.

The operating clock signal may be supplied to the GPU 1300. Of course, the operating clock signal may be supplied to other components (e.g., the CPU 1100 or the memory controller 1800). The CMU 1900 may change the frequency of the operating clock signal.

The CPU 1100, the NPU 1200, the GPU 1300, the timer 1400, the display controller 1500, the RAM 1600, the ROM 1700, the memory controller 1800, and the CMU 1900 may communicate with each other via the bus 1050.

Figure 12:
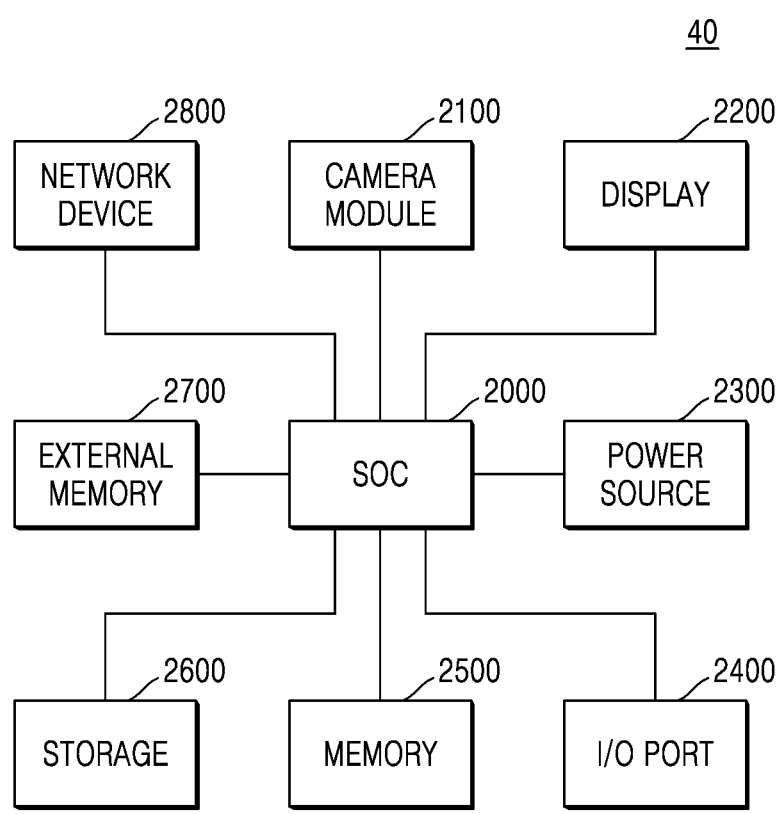
FIG. 12 is a block diagram illustrating an electronic device according to an example embodiment of the inventive concept.

FIG. 12 is a block diagram illustrating an electronic device according to an example embodiment of the inventive concept.

Referring to FIG. 12, an electronic device 40 may be implemented as a personal computer (PC), a data server, or a portable electronic device.

The electronic device 40 may include a system-on-chip 2000, a camera module 2100, a display 2200, a power source 2300, an input/output port 2400, a memory 2500, a storage 2600, an external memory 2700, and a network device 2800. In example embodiments, the system-on-chip 2000 may include the malicious attack protection circuit 100 or 400 described above with reference to FIGS. 1 and 9, respectively.

The camera module 2100 refers to a module capable of converting an optical image into an electrical image. Accordingly, the electrical image output from the camera module may be stored in the storage 2600, the memory 2500, or the external memory 2700. In addition, the electrical image output from the camera module may be displayed on the display 2200.

The display 2200 may display data output from the storage 2600, the memory 2500, the input/output port 2400, the external memory 2700, or the network device 2800. The display 2200 may be the display device 1550 illustrated in FIG. 10.

The power source 2300 may supply an operating voltage to at least one of the components. The power source 2300 may be controlled by the PMIC 1950 illustrated in FIG. 10.

The input/output port 2400 refers to a port capable of transmitting data to the electronic device 40 or transmitting data output from the electronic device 40 to an external device. For example, the input/output port 2400 may be a port for connecting a pointing device, such as a computer mouse, a port for connecting a printer, or a port for connecting a USB drive.

The memory 2500 may be implemented as a volatile memory or a nonvolatile memory. According to an embodiment, a memory controller capable of controlling a data access operation for the memory 2500, for example, a read operation, a write operation (or a program operation), or an erase operation, may be integrated or embedded in the system-on-chip 2000. According to another embodiment, the memory controller may be implemented between the system-on-chip 2000 and the memory 2500.

The storage 2600 may be implemented as a hard disk drive or a solid state drive (SSD).

The external memory 2700 may be implemented as a secure digital (SD) card or a multimedia card (MMC). According to an embodiment, the external memory 2700 may be a subscriber identity module (SIM) card or a universal subscriber identity module (USIM) card.

The network device 2800 refers to a device capable of connecting the electronic device 40 to a wired network or a wireless network.

Figure 13:
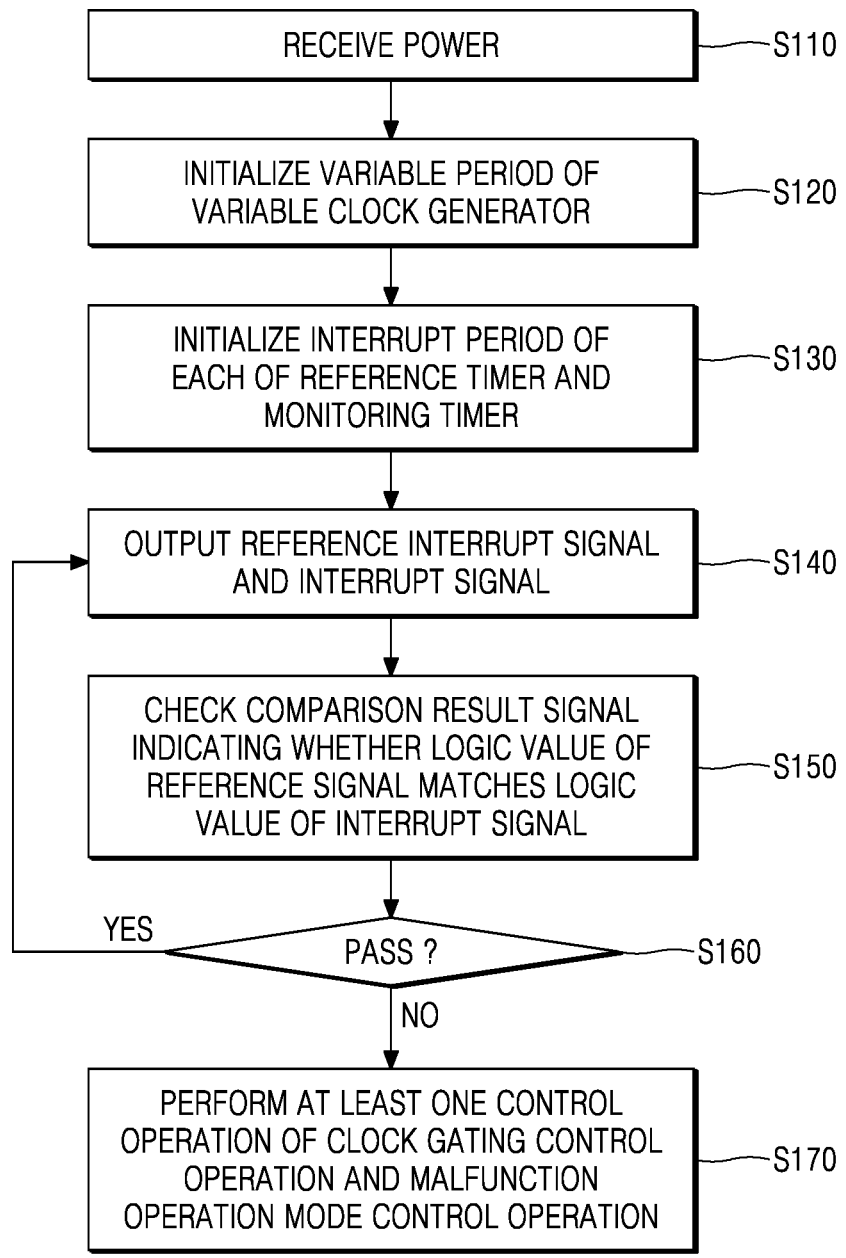
FIG. 13 is a flow chart view illustrating an operating method of a system-on-chip according to an example embodiment of the inventive concept.

FIG. 13 is a flow chart view illustrating an operating method of a system-on-chip according to an example embodiment of the inventive concept.

Referring to FIGS. 8, 9, 11, 12, and 13, the system-on-chip 10, 20, 1000, or 2000 receives power from the outside (e.g., the PMIC 1950 shown in FIG. 11) (S110).

The system-on-chip 10, 20, 1000, or 2000 initializes the clock frequency and the variable period VRY_PRD of the variable clock signal VRY_CLK in response to power supplied from the outside (e.g., the PMIC 1950 shown in FIG. 11) (S120). Specifically, the CPU 1100 initializes the variable clock generator 121 based on the boot-code stored in the ROM 1700.

The system-on-chip 10, 20, 1000, or 2000 initializes an interrupt period of each of the reference timer 112 and the monitoring timer 131 (S130). Specifically, the CPU 1100 initializes the reference interrupt period REF_INTRT_PRD and the variable interrupt period VRY_INTRT_PRD based on the boot-code stored in the ROM 1700. According to an embodiment, the CPU 1100 also initializes the first and second reference counter values based on the boot-code stored in the ROM 1700.

The system-on-chip 10, 20, 1000, or 2000 outputs the reference interrupt signal REF_INTRT and the interrupt signal INTRT (S140). Specifically, the reference timer 112 outputs a reference interrupt signal REF_INTRT every reference interrupt period REF_INTRT_PRD, and the monitoring timer 131 outputs an interrupt signal INTRT every variable interrupt period VRY_INTRT_PRD. According to an embodiment, the step S140 includes the sub-steps of: outputting a reference clock signal REF_CLK having a constant reference period REF_PRD; counting the number of times the reference clock signal REF_CLK is toggled to output the reference interrupt signal REF_INTRT when the number of times the reference clock signal REF_CLK is toggled reaches a preset first reference count value; outputting the variable clock signal VRY_CLK; and counting the number of times the variable clock signal VRY_CLK is toggled, and outputting the interrupt signal INTRT when the number of times the variable clock signal VRY_CLK is toggled reaches a preset second reference count value. The reference interrupt period REF_INTRT_PRD, the first reference count value, and the second reference count value are the same as the reference interrupt period REF_INTRT- _PRD, the first reference count value, and the second reference count value described above.

The system-on-chip 10, 20, 1000, or 2000 checks the comparison result signal COMP indicating whether the logic value of the reference interrupt signal REF_INTRT matches the logic value of the interrupt signal INTRT (S150). The comparison result signal COMP has a first logic value or a second logic value.

In the case of a pass (YES in S160), that is, when the logic value of the reference interrupt signal REF_INTRT, matches the logic value of the interrupt signal INTRT as the first logic value, step S140 is performed. Meanwhile, in an embodiment, the comparison result signal COMP is a first logic value, and the system-on-chip 10, 20, 1000, or 2000 operates in a normal mode.

In the case of a fail (NO in S160), that is, when the logic value of the reference interrupt signal REF_INTRT is different from the logic value of the interrupt signal INTRT or the former matches the latter as the second logic value, the system-on-chip 10, 20, 1000, or 2000 performs at least one control operation of a clock gating control operation and a malfunction mode control operation (S170). The clock gating control operation may be the first control operation described above, and the malfunction mode control operation may be the second control operation described above. Meanwhile, in an embodiment, the comparison result signal COMP is a second logic value, and the system-on-chip 10, 20, 1000, or 2000 operates in a malfunction mode. To protect the system-on-chip 10, 20, 1000, or 2000 from malicious attacks, the system-on-chip 10, 20, 1000, or 2000 may continue to operate in a malfunction mode from the point in time the comparison result signal COMP has the second logic value.

As described above, there is an effect of improving reliability and security by protecting the system-on-chip and the electronic device including the same from attacks of malicious users.

In addition, as described above, there is an effect of reducing manufacturing costs and integrating products by protecting encrypted information in a system-on-chip and an electronic device including the same through a relatively simple circuit.

While the inventive concept has been particularly shown and described with reference to embodiments thereof, it will be understood that various changes in form and details may be made therein without departing from the spirit and scope of the following claims.

What is claimed is:

1. A malicious attack protection circuit comprising:
   a reference interrupt generator including a reference clock generator configured to output a reference clock signal having a reference period, and the reference interrupt generator configured to output a reference interrupt signal every reference interrupt period when the number of times the reference clock signal is toggled reaches a first reference count value;
   a variable clock manager configured to output an operating clock signal to a logic circuit outside the malicious attack protection circuit and output a variable clock signal having a variable period;
   a variable interrupt generator configured to output an interrupt signal every variable interrupt period based on the variable clock signal;
   a comparison circuit configured to compare the reference interrupt signal with the interrupt signal every reference interrupt period and output a comparison result signal indicating a comparison result; and
   a controller configured to output at least one of a first control signal indicating to stop the output of the operating clock signal and a second control signal indicating that the logic circuit operates in a malfunction mode, according to the comparison result signal,
   wherein the variable interrupt generator is configured to output the interrupt signal when a count value indicating the number of times the variable clock signal is toggled reaches a preset reference count value,
   wherein a logic value of each of the reference interrupt signal and the interrupt signal has a first logic value or a second logic value opposite to the first logic value,
   wherein the logic value of the reference interrupt signal is determined based on the reference period of the reference clock signal,
   wherein the logic value of the interrupt signal is determined based on the variable period of the variable clock signal, and
   wherein each of the reference interrupt signal and the interrupt signal is a digital signal in the form of a pulse.

2. The malicious attack protection circuit of claim 1, wherein the reference interrupt generator further includes:
   a reference counter configured to count the number of times the reference clock signal is toggled, and to output, when a first count value indicating the number of times the reference clock signal is toggled reaches a first reference count value during the reference interrupt period, the reference interrupt signal.

3. The malicious attack protection circuit of claim 2, wherein the preset reference count value is a second reference count value, and
   wherein the variable interrupt generator comprises:
   a monitoring counter configured to count the number of times the variable clock signal is toggled, and to output, when a second count value indicating the number of times the variable clock signal is toggled reaches the second reference count value during the variable interrupt period, the interrupt signal.

4. The malicious attack protection circuit of claim 3, wherein the reference interrupt period is the least common multiple between an initial variable period initially set in the variable clock manager and the reference period,
   wherein the first reference count value is the number of times the reference clock signal is toggled during the reference interrupt period, and
   wherein the second reference count value is the number of times the variable clock signal is toggled with the initial variable period during the reference interrupt period.

5. The malicious attack protection circuit of claim 1, wherein the variable clock manager comprises:
   a variable clock generator configured to output the variable clock signal; and
   a clock gating circuit configured to output the variable clock signal as the operating clock signal or interrupt the output of the operating clock signal, according to the first control signal.

6. The malicious attack protection circuit of claim 5, wherein the clock gating circuit includes a logic product gate configured to perform a logic product operation on a logic value of the first control signal and a logic value of the variable clock signal.

7. The malicious attack protection circuit of claim 1, wherein the comparison circuit is configured to output:
   when the logic value of the reference interrupt signal is equal to the logic value of the interrupt signal as the first logic value, the comparison result signal having the first logic value, and when the logic value of the reference interrupt signal is different from the logic value of the interrupt signal or when the logic value of the reference interrupt signal is equal to the logic value of the interrupt signal as the second logic value, the comparison result signal having the second logic value.

8. The malicious attack protection circuit of claim 7, wherein the controller is configured to check a logic value of the comparison result signal every reference interrupt period, and output the at least one of the first and second control signals in response to the comparison result signal having the second logic value at a point in time the reference interrupt period arrives.

9. A system-on-chip comprising:
a logic circuit configured to perform an overall operation in response to an operating clock signal in a normal mode; and
a malicious attack protection circuit configured to:
output the operating clock signal to the logic circuit based on a variable clock signal, and
perform at least one of a first control operation of interrupting the output of the operating clock signal, and a second control operation of controlling the logic circuit to enter a malfunction mode from the normal mode, according to whether or not to modulate the variable clock signal,
wherein the malicious attack protection circuit comprises:
a reference clock generator configured to output a reference clock signal having a reference period;
a reference timer configured to output a reference interrupt signal when the number of times the reference clock signal is toggled reaches a first reference count value during a reference interrupt period;
a variable clock generator configured to output the variable clock signal;
a monitoring timer configured to output an interrupt signal every variable interrupt period changed according to a variable period of the variable clock signal;
a comparison circuit configured to output a comparison result signal indicating whether a logic value of the reference interrupt signal coincides with a logic value of the interrupt signal every reference interrupt period;
a controller configured to output at least one of a first control signal corresponding to the first control operation and a second control signal corresponding to the second control operation, according to the comparison result signal; and
a clock gating circuit configured to output the variable clock signal as the operating clock signal or interrupt the output of the operating clock signal, according to the first control signal,
wherein the monitoring timer is configured to output the interrupt signal when a count value indicating the number of times the variable clock signal is toggled reaches a preset reference count value,
wherein the logic value of each of the reference interrupt signal and the interrupt signal has a first logic value or a second logic value opposite to the first logic value,
wherein the logic value of the reference interrupt signal is determined based on the reference period of the reference clock signal and the logic value of the interrupt signal is determined based on the variable period of the variable clock signal, and wherein each of the reference interrupt signal and the interrupt signal is a digital signal in the form of a pulse.

10. The system-on-chip of claim 9, wherein the reference interrupt period is an integer multiple of an initial variable period initially set in the variable clock generator.

11. The system-on-chip of claim 10, wherein the variable interrupt period is the same as the reference interrupt period, if the variable clock generator outputs the variable clock signal every the initial variable period.

12. The system-on-chip of claim 9, wherein the comparison circuit includes a logic product gate configured to perform a logic product operation on the logic value of the reference interrupt signal and the logic value of the interrupt signal.

13. The system-on-chip of claim 9, wherein the controller is configured to:
check a logic value of the comparison result signal every reference interrupt period,
when the logic value of the comparison result signal is the first logic value, output the first control signal having the first logic value, and
when the logic value of the comparison result signal is the second logic value, output the first control signal having the second logic value.

14. The system-on-chip of claim 13, wherein the clock gating circuit includes a logic product gate configured to perform a logic product operation on a logic value of the first control signal and a logic value of the variable clock signal.

15. The system-on-chip of claim 9, further comprising:
an external clock generator configured to output an external clock signal,
wherein the variable clock generator configured to output the variable clock signal based on the external clock signal.

16. A method of operating a system-on-chip that includes a logic circuit, the method comprising:
initializing a variable period of a variable clock signal in response to power supplied from outside the system-on-chip;
initializing a reference interrupt period, which is a period during which a reference interrupt signal is output, and a variable interrupt period, which is a period during which an interrupt signal is output;
outputting a reference clock signal having a reference period;
outputting the reference interrupt signal every reference interrupt period when the number of times the reference clock signal is toggled reaches a first reference count value,
outputting the interrupt signal every variable interrupt period when the number of times the variable clock signal is toggled reaches a second reference count value;
checking a comparison result signal indicating whether a logic value of the reference interrupt signal matches a logic value of the interrupt signal every reference interrupt period; and
operating the logic circuit in a normal mode or a malfunction mode according to the comparison result signal,
wherein the reference interrupt period is an integer multiple of the initialized variable period of the variable clock signal,
wherein the logic value of each of the reference interrupt signal and the interrupt signal has a first logic value or a second logic value opposite to the first logic value, wherein the logic value of the reference interrupt signal is determined based on the reference period of the reference clock signal, wherein the logic value of the interrupt signal is determined based on the variable period of the variable clock signal, and wherein each of the reference interrupt signal and the interrupt signal is a digital signal in the form of a pulse.

17. The method of claim 16, wherein:

the reference interrupt period is the least common multiple of the initialized variable period and the reference period, the first reference count value is the number of times the reference clock signal is toggled during the reference interrupt period, and the second reference count value is the number of times the variable clock signal is toggled with the initialized variable period during the reference interrupt period.

18. The method of claim 16, wherein the operating of the logic circuit comprises:

when the comparison result signal has the first logic value, operating the logic circuit in the normal mode; and when the comparison result signal has the second logic value, operating the logic circuit in the malfunction mode.

19. The method of claim 18, wherein the operating of the logic circuit comprises:

continuously operating the logic circuit in the malfunction mode from a point in time the comparison result signal has the second logic value.

* * * * *